United States Patent
Kolli et al.

(10) Patent No.: US 7,500,019 B2
(45) Date of Patent: Mar. 3, 2009

(54) METHODS FOR THE INSERTION AND PROCESSING OF INFORMATION FOR THE SYNCHRONIZATION OF A DESTINATION NODE WITH A DATA STREAM CROSSING A BASIC NETWORK OF HETEROGENEOUS NETWORK, AND CORRESPONDING NODES

(75) Inventors: Yacine El Kolli, Rennes (FR); Cyril Bernier, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 10/717,455

(22) Filed: Nov. 21, 2003

(65) Prior Publication Data
US 2004/0246995 A1    Dec. 9, 2004

(30) Foreign Application Priority Data
Nov. 28, 2002    (FR)    ................... 02 14989

(51) Int. Cl.
*G06F 15/16*    (2006.01)
*H04J 3/06*    (2006.01)
(52) U.S. Cl. ...................... 709/248; 370/503
(58) Field of Classification Search ......... 709/231–232, 709/248–250; 370/503–509, 528
See application file for complete search history.

(56) References Cited

U.S. PATENT DOCUMENTS

| | | | | |
|---|---|---|---|---|
| 5,751,721 A | 5/1998 | Bloks | ................. | 370/509 |
| 6,278,718 B1* | 8/2001 | Eschholz | ................ | 370/503 |
| 6,501,743 B1* | 12/2002 | Kim et al. | ................ | 370/324 |
| 6,751,228 B1* | 6/2004 | Okamura | ................ | 370/412 |
| 2001/0008531 A1 | 7/2001 | Lanigan et al. | ............ | 370/432 |
| 2002/0009049 A1 | 1/2002 | Nomura | ................ | 370/229 |
| 2002/0141439 A1 | 10/2002 | Bardini | ................ | 370/465 |
| 2002/0150123 A1* | 10/2002 | Ro | ................ | 370/465 |
| 2005/0237928 A1* | 10/2005 | Le Scolan et al. | .......... | 370/223 |

FOREIGN PATENT DOCUMENTS

| EP | 1 047 213 | 10/2000 |
|---|---|---|
| EP | 1 052 793 | 11/2000 |
| EP | 1 122 931 | 8/2001 |

* cited by examiner

*Primary Examiner*—Yasin M Barqadle
(74) *Attorney, Agent, or Firm*—Fitzpatrick, Cella, Harper & Scinto

(57) ABSTRACT

In a method for the insertion of information to synchronize a destination node with a data stream transmitted from an entry terminal in a heterogeneous network, the heterogeneous network includes at least one sub-network conveying first packets and one basic network conveying second packets. The entry terminal is connected to the sub-network. The sub-network is connected to the basic network by means of an entry terminal forming the second packets from at least one sub-part of at least one first packet. At the occurrence of at least one pre-determined event, the entry node: forms a second synchronization packet such that the beginning of the useful information of the second synchronization packet corresponds to the beginning of a first packet; inserts a synchronization marker in the second synchronization packet; and modifies the size of a second packet preceding the second synchronization packet.

22 Claims, 10 Drawing Sheets

METHODS FOR THE INSERTION AND PROCESSING OF INFORMATION FOR THE SYNCHRONIZATION OF A DESTINATION NODE WITH A DATA STREAM CROSSING A BASIC NETWORK OF HETEROGENEOUS NETWORK, AND CORRESPONDING NODES

BACKGROUND OF THE INVENTION

1. Field of the Invention

The field of the invention is that of heterogeneous networks, including at least one basic network and at least one sub-network.

2. Description of the Prior Art

We shall now briefly recall the technical approach currently used to synchronize a destination terminal with a data stream in the context mentioned here above, namely:
- when the data stream is transmitted from an entry terminal to a destination terminal, these terminals being connected to heterogeneous network of digital buses, and
- when this stream crosses the basic network, from an entry node to at least one destination node of this basic network.

It is assumed that the digital buses convey first packets (for example IEEE 1394 packets) and the basic network conveys second packets (for example IEEE 1355 packets). Thus, the data stream concerned is conveyed on the digital buses by first packets. To enable the crossing of the basic network by this data stream, the entry node divides and/or concatenates these first packets to encapsulate them in second packets. Conversely, the destination node de-encapsulates the contents of the second packets that it receives, and then generates first packets.

Typically, the basic network is a switched network conveying second packets whose size is variable and determined by quality of service (QoS) imperatives. Since the second packets are of variable size, it is impossible to ensure an alignment of the first and second packets.

In the current technique of synchronization, in the case of a point-to-point connection, first the destination terminal and then the sender terminal is initialized. Here below the term "initial first packet" is applied to the first (in terms of rank) packet of the first (in terms of type) packets. With the current technique, the sender terminal therefore sends the initial first packet only when the destination terminal is ready to receive it. Thus, during the encapsulation performed by the entry node, this initial first packet is matched with the start or beginning of a second packet. After the de-encapsulation performed by the destination node, there is no ambiguity whatsoever on the boundary of the initial first packet. The destination terminal therefore receives an initial first packet that is strictly identical to the initial first packet generated by the entry terminal. In processing the header of this initial first packet, the destination terminal is in a position to retrieve all the other first packets that it receives thereafter.

A first drawback of the current technique mentioned here above is that it relies on a relatively cumbersome protocol, since the destination terminal has to be initialized before the entry terminal.

Another drawback of the current technique mentioned here above is that, by virtue of its very principle, it does not allow for the successive synchronization of several destination terminals on one and the same data stream. Thus, it is impossible to apply this current technique in the case of a multicast stream, where a first destination is synchronized with the stream, then one or more destination terminals must be capable of getting synchronized with this same stream at any point in time. Indeed, after the contents of the second packets received have been de-encapsulated, each destination node to which one of these other destination terminals is connected (directly or through a digital bus) generates first packets. However since the beginning of a second packet, barring accidents, is not matched with the beginning of one of the first packets generated by the entry terminal, the first packet generated by the destination node does not coincide with first packets generated by the entry terminal. In other words, the destination node is not synchronized with the data streams since the boundaries of the beginning of the first packets generated by the destination node do not coincide with the boundaries of the beginning of the first packets generated by the entry terminal. Owing to this gap, the destination terminal is never in a position to get synchronized with the stream and therefore to recover all the other first packets that it receives thereafter.

FIG. 10 illustrates the segmentation and scheduling mechanism in order to send first packets containing IEEE1394 isochronous data over the basic network using second packets, according to the prior art.

As described previously, the second packets 1000 are built in order to satisfy a quality of service when transferring data over the basic network. Their size and scheduling depend on the network conditions, and may vary over the time. In addition the transported IEEE1394 isochronous traffic may also vary over the time, as it is application dependent. Thus most of the time there is no match between the boundary of a second packet 1000 and a first packets 1001.

Considering the case where a data stream connection is already established between an entry node of the basic network and a destination node of the basic network. Another destination node of the basic network may request to be connected to that stream resulting into a multicast communication. Without the invention, the secondly connected destination node will start the reception of the data stream in an unpredictable manner and won't be able to retrieve the original IEEE1394 isochronous packets (first packets) 1001 as it won't be able to find the original packet boundary in the basic network packets (second packets) 1000.

SUMMARY OF THE INVENTION

It is a goal of the invention in particular to overcome these drawbacks of the prior art.

More specifically, it is one of the goals of the present invention to provide a method of synchronization that does not make it necessary to first of all initialize the receiver terminal.

It is another goal of the invention to provide a method of this kind that is simple to implement and costs little.

It is an additional goal of the invention to provide a method of this kind that can be applied in the case of a multicast stream, namely a method that enables several receiver terminals to get synchronized successively with a same stream.

It is yet another goal of the invention to provide a method of this kind enabling the least possible deviation from a QoS contract for the transmission of data streams.

It is also a goal of the invention to provide a method of this kind that enables the optimizing of the resources, and especially does not necessitate the use of filler data (and entails no bandwidth losses).

These different goals, as well as others are still appear hereinafter, are achieved according to the invention by means of a method for the insertion of information to synchronize a destination node with a data stream transmitted from an entry terminal in a heterogeneous network, the heterogeneous network including at least one sub-network conveying first packets and one basic network conveying second packets, the entry terminal being connected to the sub-network, the sub-network being connected to the basic network by means of an entry node forming the second packets from at least one sub-part of at least one first packet. According to the invention, at the occurrence of at least one pre-determined event, the entry node:

forms a second synchronization packet such that the beginning of the useful information (or payload data) of the second synchronization packet corresponds to the beginning of a first packet;

inserts a synchronization marker in the second synchronization packet; and modifies the size of a second packet preceding the second synchronization packet.

The invention also relates to a method for the processing of information for the synchronizing of a destination node with a data stream transmitted from an entry terminal in a heterogeneous network, the heterogeneous network including at least one sub-network conveying first packets and a basic network conveying second packets, the sub-network being connected to the basic network by means of a destination node. According to the invention the destination node:

detects a second synchronization packet among the second packets conveyed by the basic network by means of a synchronization marker contained in the second synchronization packet;

forms a first synchronization packet from at least one second synchronization packet, such that the beginning of the first synchronization packet corresponds to the beginning of the useful information of the second synchronization packet; and transfers the first synchronization packet to the sub-network.

The invention also relates to a node in a heterogeneous network, the heterogeneous network including at least one sub-network conveying first packets and a basic network conveying second packets, the node comprising:

forming means for forming a second synchronization packet such that the start of the payload data of the second synchronization packet corresponds to the start of a first packet;

inserting means for inserting a synchronization marker in the second synchronization packet; and modification means for modifying the size of a second packet preceding the second synchronization packet.

The invention also relates to a node in a heterogeneous network, the heterogeneous network including at least one sub-network conveying first packets and one basic network conveying second packets, the node comprising:

detecting means for detecting a second synchronization packet among the second packets conveyed by the basic network by a synchronization marker contained in the second synchronization packet;

forming means for forming a first synchronization packet from at least one second synchronization packet, such that the beginning of the first synchronization packet corresponds to the beginning of the useful information of the second synchronization packet; and transmitter for transmitting the first synchronization packet to the sub-network.

BRIEF DESCRIPTION OF THE DRAWINGS

Other features and advantages of the invention should appear from the following description of a preferred embodiment of the invention, given by way of an example that provides an indication and in no way restricts the scope of the invention, and from the appended drawings, of which.

MORE DETAILED DESCRIPTION

Figure 1:
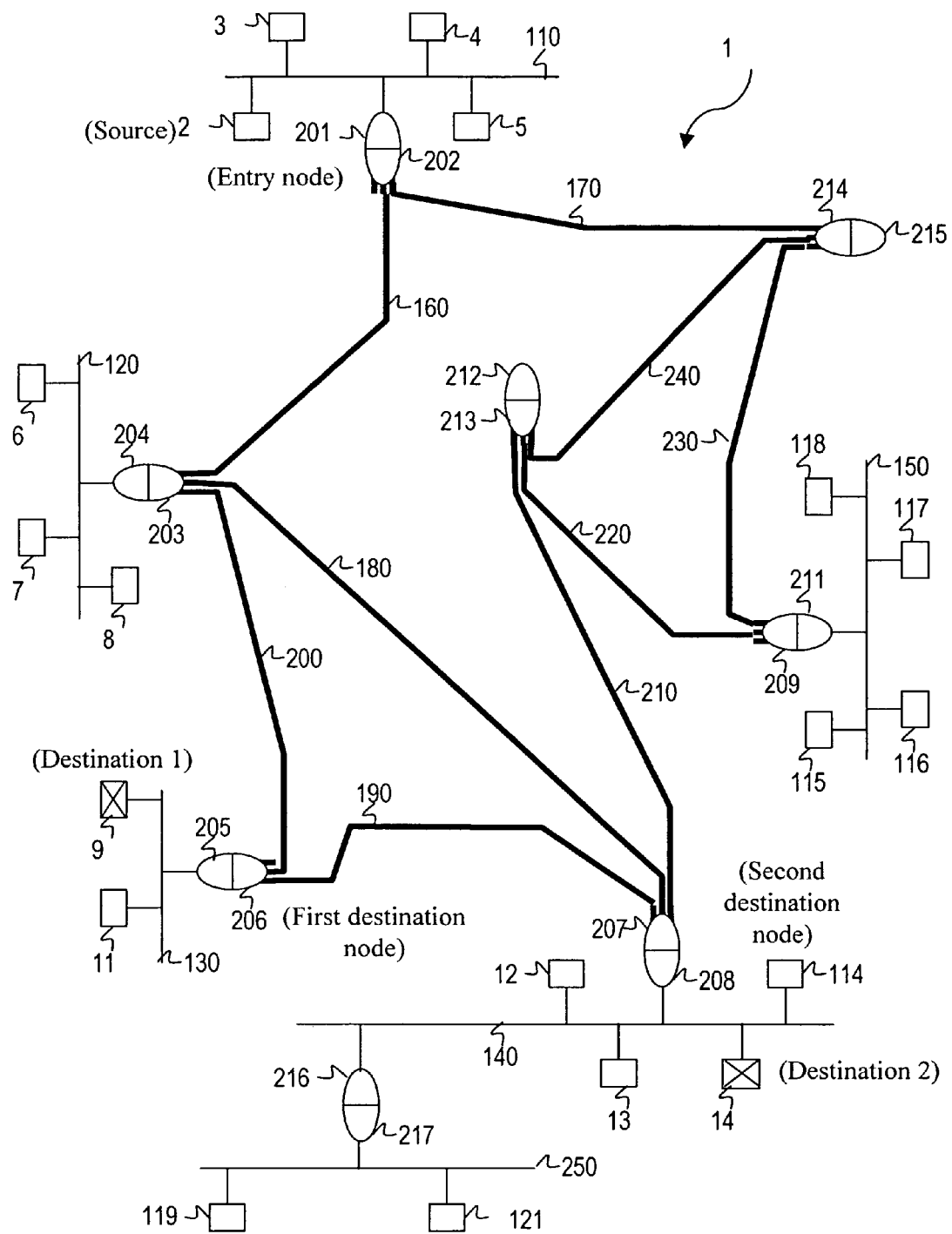
FIG. 1 is a block diagram of an example of a home audiovisual network, of the digital bus heterogeneous network type, in which it is possible to implement the synchronization method according to the invention.

Referring to FIG. 1, we shall now present an example of a home audiovisual network in which the method of synchronization according to the invention can be implemented.

This home audiovisual network is a heterogeneous network of IEEE 1394 type digital buses, whose basic network 1 is a switched network comprising links connected to each other by IEEE 1355 type links.

In other words, a plurality of IEEE 1394 type buses 110, 120, 130, 140, 150 and 250 are interconnected to one another and/or to a switched network 1. The terminals connected to the different digital buses are referenced 2 to 9, 12 to 15, 119, 121, 115, 116, 117 and 118.

The interconnection of the switched network 1 and of the IEEE 1394 buses is achieved by means of particular nodes, also called "heterogeneous bridges", each consisting of two paired portals, 201/202, 203/204, 205/206, 207/208 and 209/211. (A heterogeneous bridge consisting of portals referenced X and Y is thus referenced X/Y). Each of these heterogeneous bridges therefore has a first portal connected to the switched network 1 and a second portal connected to an IEEE 1394 type digital bus. In other words, each heterogeneous bridge has first interfacing means, enabling the connection of one or more IEEE 1355 type links and second interfacing means, enabling the connection of an IEEE 1394 type digital bus. Each heterogeneous bridge of FIG. 1 complies with the: "Standard for High Performance Serial Bus Bridges" mentioned here above.

Optionally, the heterogeneous bridges may furthermore comprise third interfacing means, enabling the connection of one or more analog terminals.

The bridge referenced 216/217 is a homogeneous bridge of the heterogeneous network of FIG. 1, interconnecting two IEEE 1394 type buses. This bridge referenced 216/217 also complies with the "Standard for High Performance Serial Bus Bridges".

All the (homogeneous or heterogeneous type) bridges of FIG. 1 play a role of resource reservation during the setting up of a stream connection, as described in greater detail in the "Standard for High Performance Serial Bus Bridges". These bridges, on the routing path, going from an isochronous entry terminal or talker to at least one destination terminal or listener, interpret and exchange inter-bridge messages (for example messages of the following type: "JOIN", "LISTEN", "LEAVE" and "STREAM STATUS") as laid down by the IEEE P1394.1 standard. Such messages give information on the talker, the listener, the bandwidth needed to convey isochronous data and the stream connection set-up status.

The switched network 1 consists of links referenced 160, 170, 180, 190, 200, 210, 220, 230 and 240 which interconnect firstly nodes referenced 201/202, 203/204, 205/206, 207/208 and 209/211, forming heterogeneous bridges and, secondly, nodes referenced 212/213 and 214/215, internal to the switched network 1.

Figure 2:
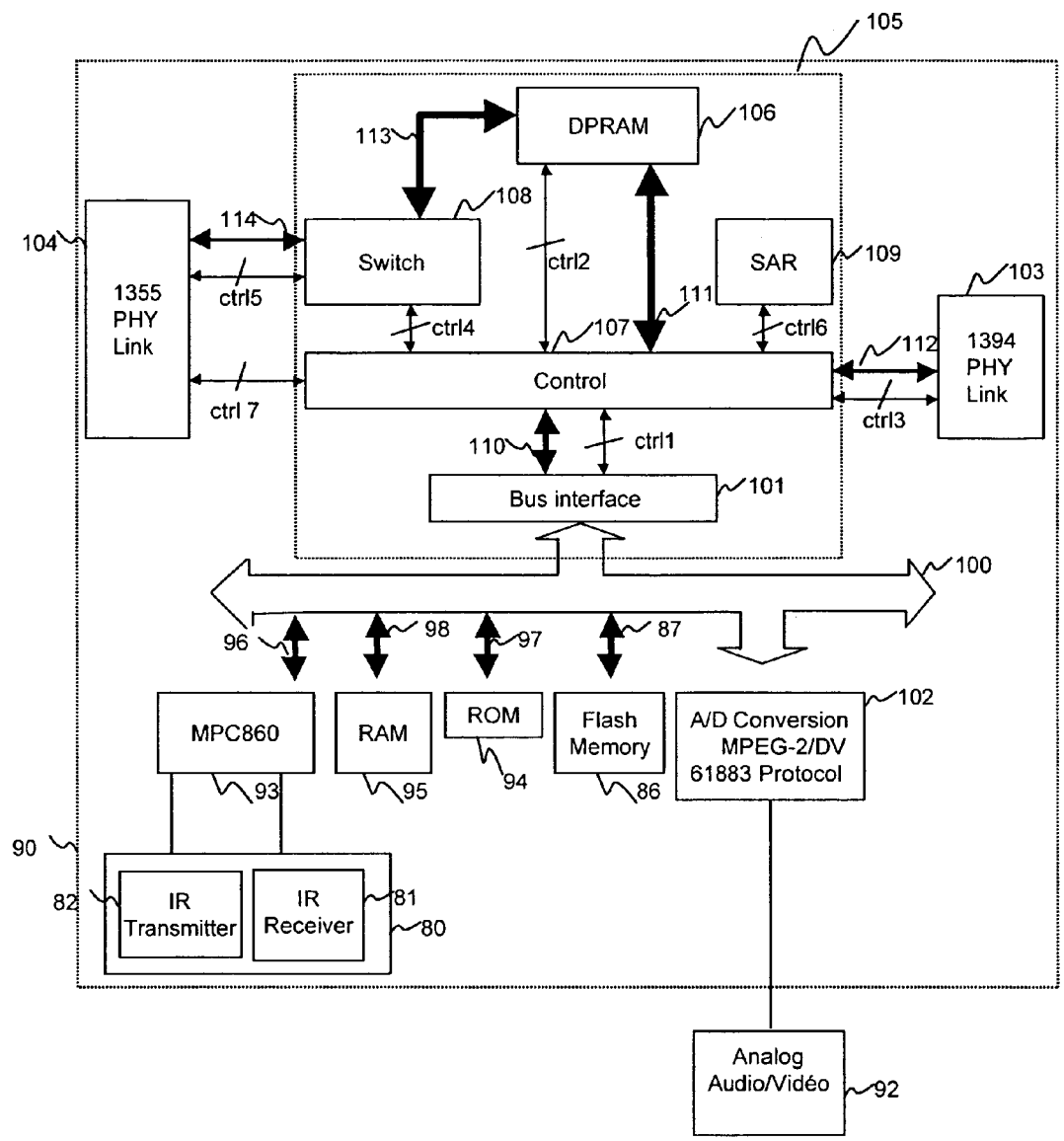
FIG. 2 is a block diagram of an example of a node of the switched network contained in the home audiovisual network of FIG. 1.

The package routing through the switched network 1 is achieved by implementing a method of source routing, according to which the routing information of a packet is computed by a central processing unit or CPU, referenced 93 in FIG. 2. This CPU knows the topology of the switched network 1. This aspect shall not be described in greater detail in the context of the present invention.

Hereinafter in the description, we shall consider the following example (pertaining to a multicasting situation):
the terminal referenced 2 is an entry terminal or "talker" (for example, a digital camcorder);
the node (heterogeneous bridge) referenced 201/202 is an entry node in the switched network for the stream generated by the entry terminal;
the terminal referenced 9 is a first destination terminal or "listener No. 1" (for example, a digital television set), which must set up a connection with the entry terminal 2 and get synchronized with the stream generated by this terminal;
the node (heterogeneous bridge) referenced 205/206 is a first destination node of the switched network, for the stream addressed to the first destination terminal;
the terminal referenced 14 is a second destination terminal, or "listener No. 2" (for example a digital television set) which, after the synchronization of the first destination terminal, must also set up a connection with the entry terminal 2 and get synchronized with the same stream;
the node (heterogeneous bridge) referenced 207/208 is a second destination node of the switched network, for the stream addressed to the second destination terminal.

FIG. 2 is a block diagram of a switching device 90 of a node (heterogeneous bridge) of the switched network 1 appearing in FIG. 1.

In the embodiment shown in FIG. 2, the switching device 90 is associated with an analog audio/video interface 92. This interface 92 is connected, within the switching device 90, to an analog/digital conversion module 102 which is also compliant with an isochronous streaming protocol according to the 1394 video standard. The conversion module 102 furthermore has compression means of the MPEG-2 (Moving Pictures Expert Group according to the ISO/IEC 13818-1, 13818-2, 13813-3 standards) type and DV (digital video means according to the DV IEC 61834 standard described in the document "Specifications Of Consumer-Use Digital VCRs Using 6.3 mm Magnetic Tape", December 1994, "HD Digital VCR Conference") type, as well as processing means according to the IEC-61883 protocol (as defined in the "International Standard Consumer Audio/Video Equipment—Digital Interface, first edition 1998-02, IEC 61883-1/2/3/4/5") for conveying audio/video digital signals The switching device 90 comprises:
a microcontroller 93 which for example is of the Motorola (registered trademark) MPC860 type. A microcontroller of this type has input/output interfaces which for example connect an infrared transmitter/receiver;
a ROM type permanent storage means 94;
a RAM type temporary storage means 95 associated with the microcontroller 93 into which an initialization software architecture is loaded; and
a flash memory type permanent storage means 86 used to permanently store certain data (for example data resulting from the unique identification of a node within the home audiovisual network of the invention).

The RAM storage means 95 is capable of storing data packets of different types, especially:
asynchronous packets of the type compliant with the IEEE 1394 standard;
packets constituting messages in unconnected mode (asynchronous packets) of the type compliant with the IEEE 1355 standard;
control packets of the type complaint with the IEEE 1355 standard;
stream (isochronous) packets of the type compliant with the IEEE 1355 standard.

The packets of the type compliant with the IEEE 1355 standard really exist in the component 104 but are not stored in this form in the RAM storage means 95. It will be noted that the storage means 95 contain the information needed to generate the IEEE 1355 packets.

The microcontroller 93 is furthermore connected to an infrared module 80 comprising reception means 81 and transmission means 82 for infrared signals. A module 80 of this kind may furthermore carry out an analog/digital conversion and a digital/analog conversion of the signals.

These four elements 86, 93, 94 and 95 communicate by means of the respective address and data buses referenced 87, 96, 97 and 98. In particular, they can exchange data by means of a main bus 100 with at least one bus interface component 101. Should the bus 100 be a PCI (peripheral component interconnect) standard bus, the component 101 may be a component called the AMCC 5933QC commercially distributed by Applied Micro Circuits Corporation (Registered Mark).

The bus 100 can also connect other elements, not shown in FIG. 2, to one another. These other elements are themselves provided with a bus interface and can implement, for example, data-processing functions.

As shown in FIG. 2, the node according to the invention also has interfacing means 103 and 104.

The means 103 are designed to provide an interface between the node 90 and the serial communications bus designed to work according to the IEEE 1394 standard to which said node is attached. It is compliant with the "IEEE Std 1394a-2000, Standard for a High Performance Serial Bus (Supplement)". It may be recalled that the IEEE 1394 standard is described in the following reference documents: IEEE Std 1394-1995, Standard for High Performance Serial Bus; IEEE Std 1394a-2000, Standard for High Performance Serial Bus. A third document "IEEE P1394.1 Draft 0.17 Standard for High Performance Serial Bus Bridges" describes the way to interconnect the different IEEE 1394 buses.

The interfacing means 103 is a set of PHY/LINK 1394 components constituted for example by a component PHY TSB21LV03A and a component LINK TSB12LV01A commercially distributed by the firm Texas Instruments (Registered Mark) and connectors 1394, for example commercially distributed by the firm MOLEX (Registered Mark) for example under the reference 53462.

The interfacing means 103 comprises at least one external port designed to be connected to the digital terminal that is attached to the 1394 serial communications bus.

The interfacing means 104 mentioned here above is an IEEE 1355 interface component with three ports. It has especially a component C113 (referenced 120 in FIG. 2) commercially distributed by the company 4LINKS (Registered Mark) as well as three interface components LUC1141MK commercially distributed by the company LUCENT (Registered Mark). These components are themselves connected to IEEE 1355 connectors, for example commercially distributed by the firm HARTING (Registered Mark). The component C113 is itself based on a Spartan XCS30XL FPGA (field programmable gate array) type programmable component, commercially distributed by the firm XILINX (Registered Mark).

The three external ports of the interfacing means 104 are designed to be connected to ports of the same type on another switching node of the switched network, thus enabling the device 90 to communicate with another node of this network.

The device 90 also has a data stream control means 105 used to transfer data among the different interface components 101, 103 and 104. This means 105 is formed by programmable logic means executed by an FPGA type component, for example the component referenced VIRTEX, commercially distributed by the company XILINX.

This means 105 comprises especially a dual port storage unit 106 used to store data addressed to or coming from the 1355 switched network. This storage unit 106 can also be seen as a means for the transfer of data from the IEEE 1394 interface (103) to the interface of the switched network (104), and vice versa.

The dual port storage unit has a storage capacity of less than 2 Mbits and is made for example in a form of a 32-bit access DPRAM type memory. The initials DPRAM refer to "dual port random access memory".

The storage unit 106 has a plurality of memory zones managed as individual FIFO (first-in first-out) type memories. A memory zone of this kind corresponds to a memory in which the data elements are read in the order in which they were first written. These memory zones each comprise a read pointer and a write pointer that are associated with each other. Since each memory zone is managed as a FIFO type memory, it can be filled and emptied at the same time and independently. This desynchronizes the data read and write operations, performed by a switching unit 108 that will be defined here below, from the data read and write operations performed by the control module 107. Indeed, the occupancy rate of the memory zone considered is managed circularly and it is known, at all times, whether the data contained in a memory zone have been read or not. When these data have been read, then new data can be written in their place.

The dual port memory unit is, so to speak, a queue for the packets and the storage function is carried out independently, depending on the port by which the packets reach the memory unit. In general, all the isochronous (stream) or asynchronous data coming from the switched network are stored in the storage unit 106.

This storage is temporary for the asynchronous data packets (namely packets constituting a message transmitted in non-connected mode) and for the control packets which are then transferred into the RAM storage means 95 for storage for a longer duration.

By contrast, the isochronous data packets (or stream type packets, namely packets transmitted in connected mode) are stored only in this storage unit 106 before being transmitted on the communications bus, to which the switching node 90 is connected, or on the switched network.

This can be explained by the fact that this type of data must be transferred as speedily as possible from the switched network to the bus and must therefore be stored in a storage means that is easily and speedily accessible.

Similarly, the isochronous or stream data packets that come from the communications bus to which the switching node 90 is connected and are intended for the switched network, are stored only in the storage unit 106 and not in the storage means 95 for the same reasons as those referred to here above.

Thus, as shown in FIG. 1, the data stream control means 105 comprises several other elements, including
 a control module 107 (already mentioned here above) that communicates with the interfacing means 103 and 104 as well as with the bus interface component referenced 101,
 a switch 108 (already mentioned here above) that communicates the interfacing means 104, the storage unit 106 and the control module 107,
 a data packet arranging unit 109 that is linked to the control module 107.

The control module 107 has a function of controlling the storage unit (DPRAM) It also has the function of multiplexing the read or write accesses to registers of other modules from the main bus referenced 100. The module 107 also has control over the bus interface component 101 for the read and write operations on the main bus 100, including especially transfer in burst mode. The control module 107 is also responsible for activating interruptions on the main bus 100 as a function of particular communications events. This module exchanges data with the component 101 on an add-on bus 110, depending on the control signals referenced ctrl1.

As indicated here above, the module 107 is responsible for controlling the storage unit 106 with respect to the read and write operations in FIFO mode, in the special case where the bus interface component 101 is an AMCC, by means of a data bus 111 and control signals ctrl2.

The interfacing means 103 contain FIFO type memories used during the transfer of data packets of a type compliant with the IEEE 1394 standard. It has two transmission FIFO memories known as an ATF (asynchronous transfer FIFO) and an ITF (isochronous transfer FIFO) and one reception FIFO memory known as a GRF (general receive FIFO). These FIFO memories are extensively described in the literature associated with the component LINK TSB12LVO1A.

The control module 107 and the interfacing means 103 manage the data transfer on a bus 112, by means of the control signals ctrl3.

Furthermore, the control module 107 controls the switching unit 108 by means of control signals ctrl4 in order to transfer data from the switching unit to the storage unit 106 by means of a data bus 113 and vice versa. The switching unit 108 is connected to the interfacing unit 104 by means of a data bus 114 and control signals ctrl5.

The data packet arranging unit 109 is hereinafter called the SAR (segmentation and reassembling) module. This module is used for the segmentation and reassembly of data coming from and sent to the interface of the switched network 104. Thus, the IEEE 1394 type isochronous packets may be segmented and encapsulated in IEEE 1355 type packets which are then transmitted on the switched network 1. The transfer of asynchronous packets does not form part of the present invention and shall therefore not be described in greater detail.

Furthermore, the SAR module 109 plays a scheduling role for the transmission of data on the network, in order to comply with the time constraints dictated by isochronous transfers. It informs the control module 107 of the next data packets to be transmitted, by means of control signals ctrl6.

Figure 3:
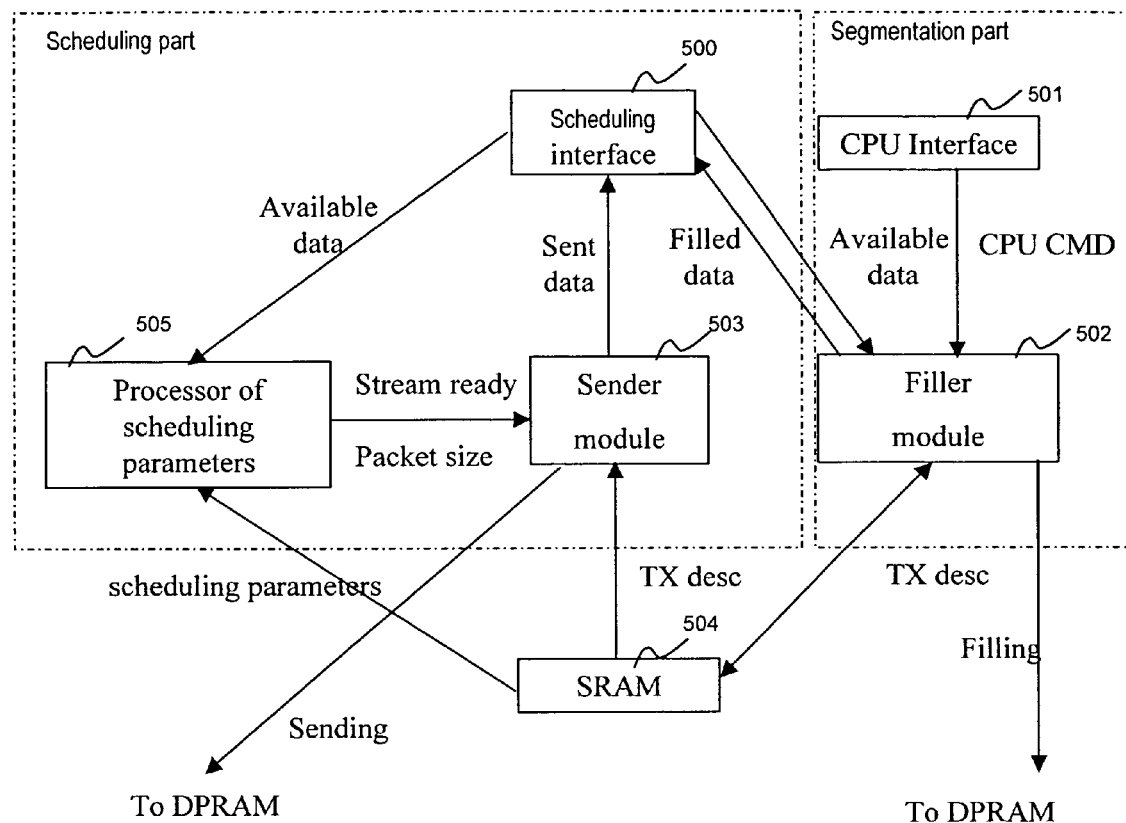
FIG. 3 is a block diagram of an example of a embodiment of the SAR module of the node of FIG. 2.

Referring now to FIG. 3, we shall present an example of an embodiment of the SAR module 109 of the heterogeneous bridge of FIG. 2.

The SAR module 109 manages for example three types of streams: asynchronous control streams, asynchronous message streams and synchronous data streams (audio/video isochronous streams). The asynchronous control streams have maximum priority and the asynchronous message streams have minimum priority. The asynchronous control and message streams require no connection. The asynchronous message streams and the synchronous data streams necessitate a bandwidth allocation. The asynchronous control streams necessitate no bandwidth allocation and must therefore be as small as possible so as to create the least possible disturbance for the synchronous data streams. The asynchronous control streams (for the management of the switched network) are taken into account in the maximum bandwidth available for the asynchronous message streams and the synchronous data streams. For example, a maximum of 80% of each linking pass-band may be allocated to the asynchronous message streams and to the synchronous data streams, leaving 20% for the asynchronous control streams. This distribution may be refined in the light of network stimulations and prototype performance tests.

In the example of an embodiment shown in FIG. 3, the SAR module 109 comprises:
- a scheduler part, itself comprising a scheduling interface 500, a scheduling parameter processor 505 and a sender module 503;
- a segmentation-related part or segmenter itself comprising a CPU interface 501 and a filler module 502;
- a SRAM 504.

We shall now present the working of this SAR module 109. The filler module 502 carries out DMA ("Direct Memory Access") operations from the CPU RAM 95 (FIG. 2) to the DPRAM 106 (FIG. 2). The interface CPU 501 contains a register used to send CPU commands ("CPU CMD"). The sender module 503 transfers data from the DPRAM 106 (FIG. 2) to the switch 108 (FIG. 2). The scheduling parameter processor 505 supplies transfer states to the sender module 503, during the transfer. This processor 505 is described in detail here below with reference to FIG. 4. The scheduling interface 500 gives the remaining memory in the DPRAM to the filler module 502 and the data available to the scheduling parameter processor 505. The SRAM memory 504 contains the transfer descriptor associated with each isochronous data stream.

Figure 4:
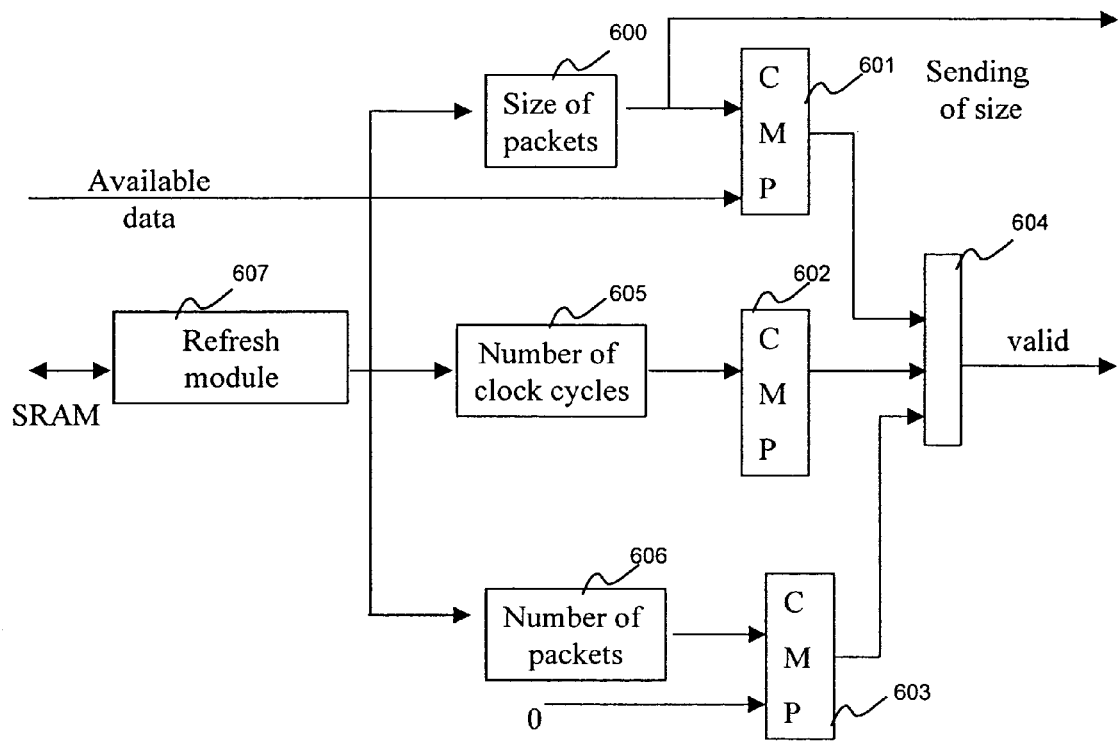
FIG. 4 illustrates an example of a embodiment of a processing cell contained in a processor of planning parameters included in the SAR and appearing in the block diagram of FIG. 3.

Referring now to FIG. 4, we shall present an example of an embodiment of a processing cell included in the scheduling parameter processor 505 contained in the SAR module 109 and appearing in the block diagram of FIG. 3.

The scheduling parameter processor 505 comprises a processing cell for each stream not dedicated to the control. FIG. 4 shows a functional diagram of such a cell. In this diagram, the refresh module 607 loads the scheduling parameters coming from the SRAM 504 into the registers whenever the cycle counter ("Dyn Time counter") 605 reaches zero, or whenever the packet counter ("Dyn PK counter") 606 reaches zero too.

The refresh module 607 verifies the modifications of the transfer parameters which may be requested by the CPU. The scheduling parameters contain three types of information (each associated with a distinct register): the size of the packets (register 600) that must be transferred to the switched network (segmentation of the data contained in the DPRAM), the number of packets (register 606) that must be transferred in a specified number of clock cycles (register 605). For the stream considered, the refresh module 607 informs the sender module 503 of the situation of the scheduling parameters. The size of the packets is compared with the data available in DPRAM (information given by the scheduling interface 500), the remaining number of clock cycles is compared with zero, and the remaining number of packets is compared with zero in order that the sender module 503 may be informed of the progress of the transfer.

Figure 5:
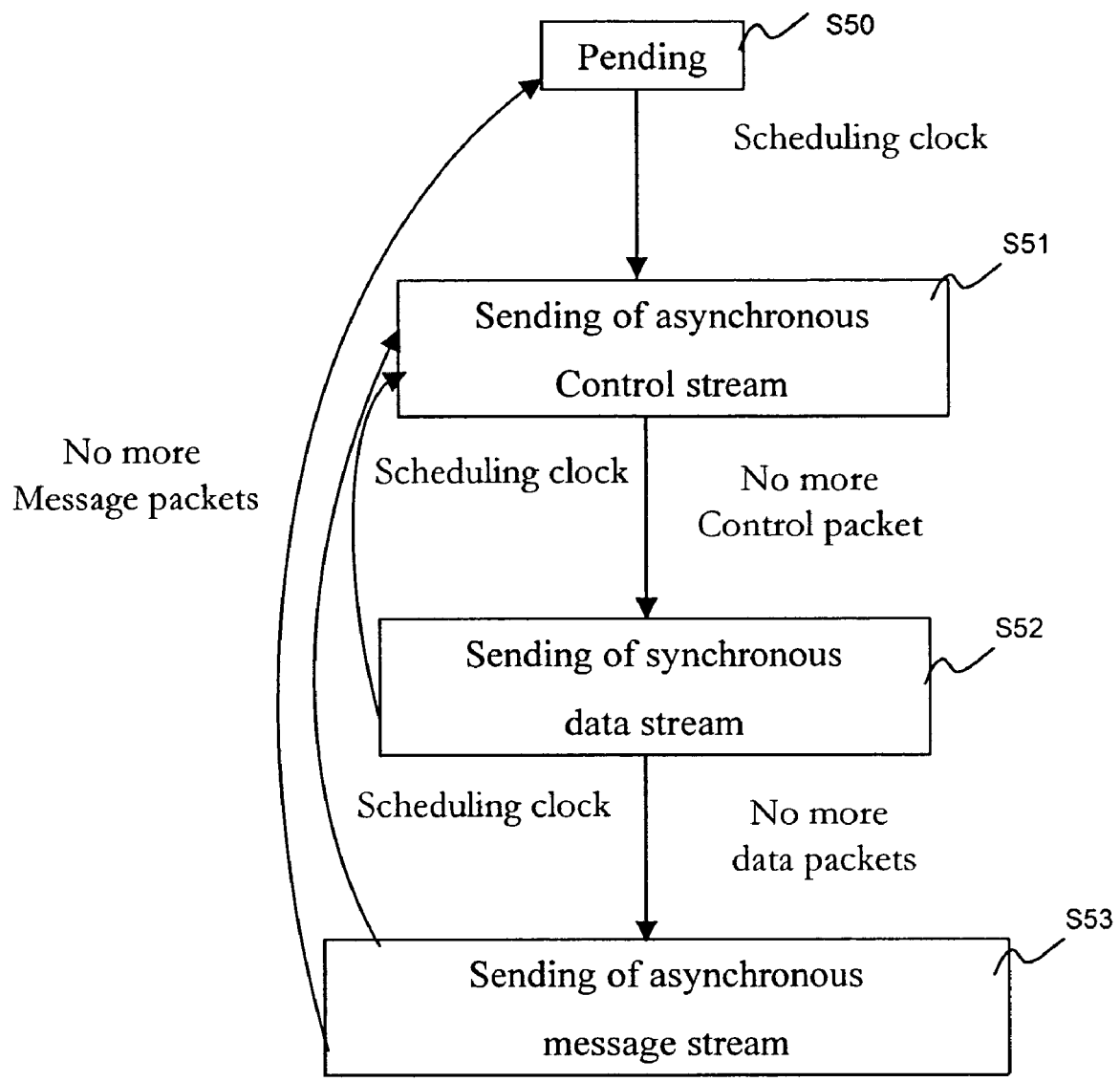
FIG. 5 illustrates the algorithm of distribution executed by the transmission module included in the SAR and seen in the block diagram of FIG. 3.

Referring to FIG. 5, we shall now describe the distribution algorithm executed by the sender module 503 contained in the SAR module 109 and appearing in the block diagram of FIG. 3. This algorithm indicates the fact that the SAR module 109, for the transfer of packets on the links of the switched network, is not based on TDM ("Time Division Multiplexing"). The SAR module 109 is used for the dispatch of three types of packets (belonging respectively to an asynchronous control stream, an asynchronous data stream, and an synchronous message stream) according to set priorities. For each data stream, the CPU managing the load of the network assigns a priority and transmission parameters (packet counter, length of packets and time margin of packets expressed in multiples of 125 µs). The positive variations (overflow) or negative variations (underflow) of transmission are detected in order to enable the CPU to refine the specifications of the transmission parameters.

Figure 6:
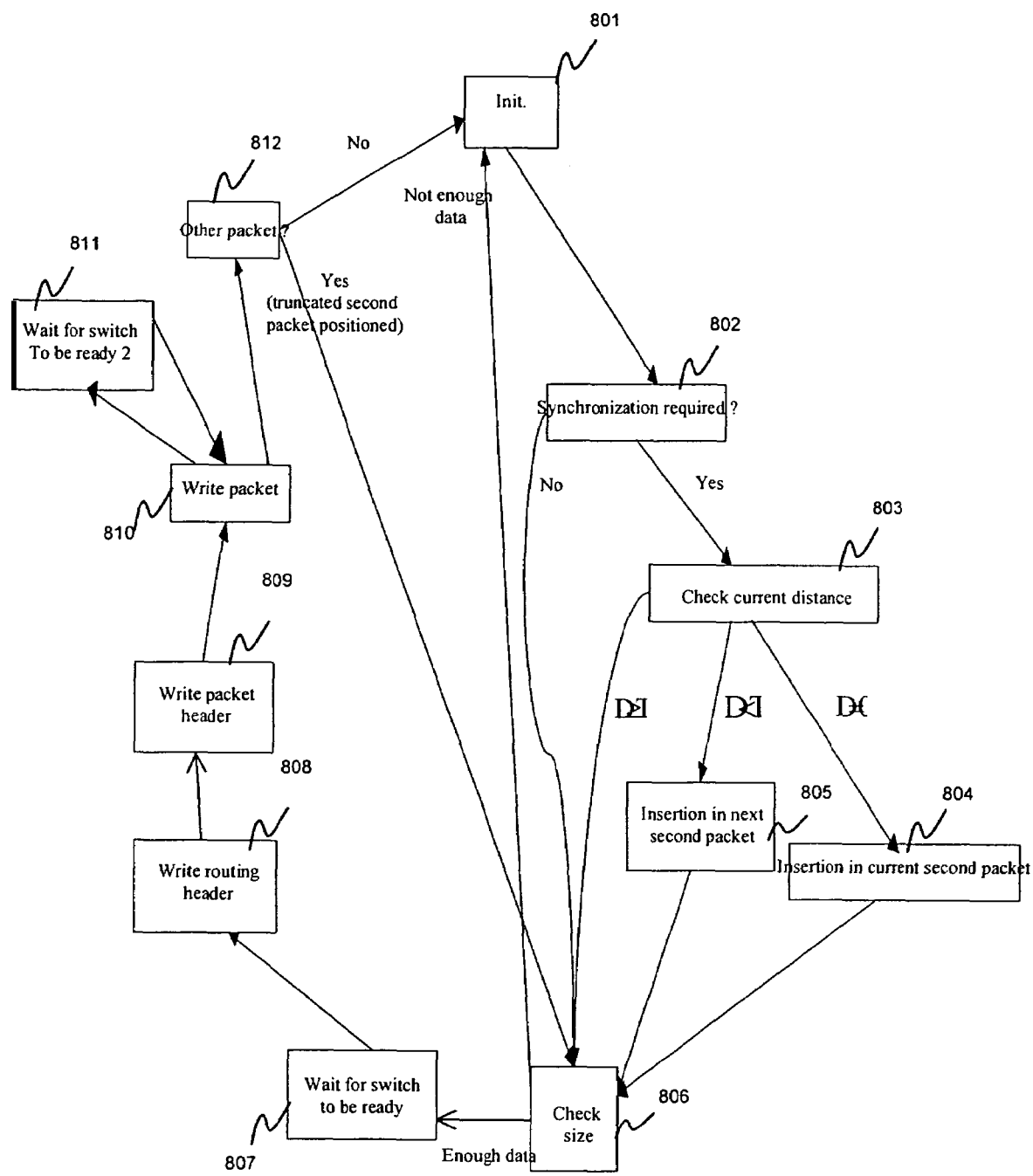
FIG. 6 is a flow chart of a particular embodiment of the method of synchronization according to the invention, for the part implemented by the SAR module of the entry node.

Referring to the flow chart of FIG. 6, we shall now present a particular embodiment of the method of synchronization according to the invention, for the part implemented by the SAR module 109 of the entry node.

It may be recalled that this entry node, referenced 201/202 in the above-mentioned example, has to generate second (IEEE 1355 type) packets to be sent on the switched network, to the destination node (heterogeneous bridge). First (IEEE 1394 type) packets are encapsulated in these second packets.

In the "initialization" state (referenced 801), the SAR module waits for an indication that a second packet has been sent. This indication is given by a scheduling engine.

In the "synchronization required ?" state (referenced 802), the SAR module decides if it is appropriate (positive decision) or not (negative decision) to perform a synchronization step, namely a matching with the starting boundary of a first packet.

In a first embodiment of the invention, the SAR module takes a positive decision if the decision-making instant belongs to a set of predetermined instants (first condition). These predetermined instants are, for example, instants that succeed one another in a cycle with a fixed period. They are given by a clock register included in the SAR module.

In a second embodiment of the invention, the SAR module takes a positive decision if the decision-making instant follows the reception, by the entry node, of a synchronization request sent out by one of the destination terminals (second condition). This decision may be taken by a software program executed by the central processing unit 93 (FIG. 2) of the receiver node.

It is also possible to combine the above-mentioned first and second embodiments so that the SAR module takes a positive decision if at least one of the first and second conditions is verified.

If the SAR module decides that it must perform a synchronization step (in case of a positive decision) it goes into the "checking of current distance D" state (referenced 803); if not (in the case of a negative decision) it goes into the "checking of size" state (referenced 806).

In the "checking of current distance" state (referenced 803), the SAR module asks for this distance information D from the control module 107 of the DPRAM 106, also included in the entry node. If the distance D is equal to zero, the SAR module goes into the "Insertion in current second packet" state (referenced 804). If the distance D is smaller than the normal size T of a second packet (at the instant considered), the SAR module goes into the "Insertion in the next current second packet" state (referenced 805). If the distance D is greater than or equal to the normal size T of a second packet (at the instant considered), the SAR module goes into the "checking of size" state (referenced 806), without carrying out any synchronization.

Figure 7:
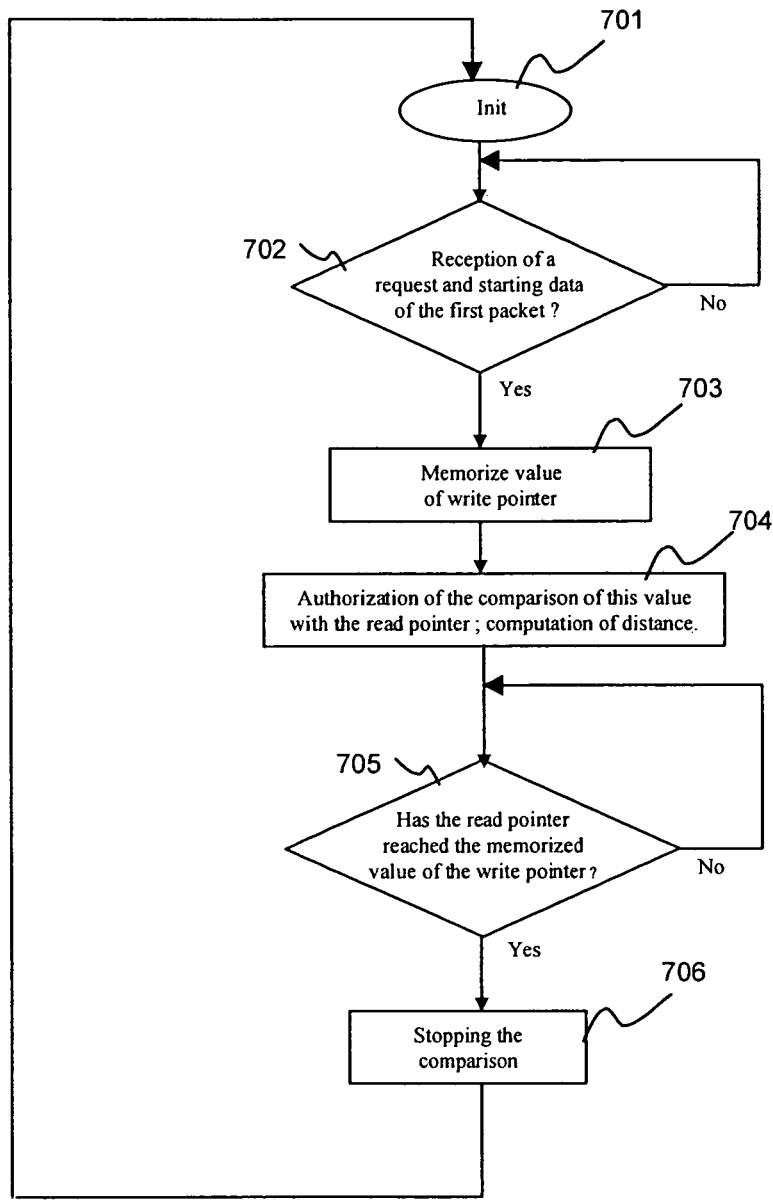
FIG. 7 is a flow chart of a mechanism for obtaining a current distance in memory, this mechanism being executed by the DPRAM controller of the entry node, upon a request made by the SAR module of this same entry node during one of the steps of the flow chart of FIG. 6.

Referring now to FIG. 7, we shall now present the mechanism for obtaining the current distance in memory. This mechanism is executed, within the entry node, by the control module 107 of the DPRAM 106, hereinafter called the "controller" 107.

It may be recalled that the DPRAM 106 comprises several memory zones (or <<buffers>> in which there are stored first packets (of the IEEE 1394 type) coming from the IEEE 1394 interfacing means (referenced 103 in FIG. 2). These first packets must be encapsulated by the SAR module in second (IEEE 1355 type) packets sent, through the switch 108, to the IEEE 1355 interfacing means (referenced 104 in FIG. 2).

After an initialization step (referenced 701), the controller 107 (in the step referenced 702) determines whether it has received a request and first data, marked as a starting boundary of a first packet, from the IEEE 1394 interfacing means (103). If the answer is negative, it reiterates the step referenced 702. If the answer is positive, then (in the step referenced 703), it memorizes the value of the write pointer, which corresponds to the memorized position of a following start of a first packet. Then (in the step referenced 704), it permits the comparison of this memorized value of the write pointer with the current value of the read pointer used for the building of the second packets, so as to obtain the current distance, at the instant considered. Thus, at each request for the reading of a memory zone or buffer of the DPRAM 106, the current distance to the next start of the first packet is computed.

This computation can be expressed by the following formula:

Distance=(memorized value of the write pointer)–
(current value of the read pointer)modulo(size of
a buffer of the *DPRAM*)

Then, the controller 107 (in a step referenced 705) ascertains that the READ pointer has reached the stored value of the read pointer. If the answer is positive, it stops the comparison (step referenced 706) and returns to the initial step (referenced 701). If not, it returns to the step referenced 705.

We shall now continue with the description of the flow chart of FIG. 6.

In the "Insertion in the second current packet" state (referenced 804), the SAR module positions a flag called a "synchro insertion" flag whose role is specified here below (see state referenced 809).

In the "Insertion in the following second packet" state (referenced 805), the SAR module modifies the normal size of the second packets so as to obtain a first modified size equal to the current distance. Furthermore, in a register named "remaining size", its stores the result of the difference between the normal size and the current distance. Finally, it positions a flag called a "truncated second packet", whose role is specified here below (see state referenced 812).

In the "checking of size" state (referenced 806), the SAR module asks the controller 107 for the size of the data available in the DPRAM 106. If there are sufficient data in the DPRAM to send the second packet, then the SAR module goes into the "waiting for switch to be ready" state (referenced 807). If not it returns to the "Initialization" state (referenced 801).

In the "waiting for switch to be ready" state (referenced 807), the SAR module waits until the FIFO memory of the switch 108 becomes empty. Then it goes into the "writing of the routing header" state (referenced 808).

In the "writing of the routing header" state (referenced 808), the SAR module writes the routing header to the FIFO memory of the switch 108. Then it goes into the "writing of the packet header" state (referenced 809).

In the "writing of the packet header" state (referenced 809), the SAR module inserts a synchronization marker into the header of the second packet, if the "synchro insertion" flag has been positioned beforehand (see states 804 and 812). Then it goes into the "writing of the packet" state (referenced 810).

In the "writing of the packet" state (referenced 810), the SAR module transfers data from the DPRAM 106 to the FIFO memory of the switch 108. If the FIFO memory gets full, it goes into the "waiting for switch to be ready 2" state (referenced 811) until it becomes empty again. When all the data corresponding to the size of the second packet have been transferred, the SAR module goes into the "other packet?" state (referenced 812).

In the "other packet ?" state (referenced 812), if the "truncated second packet" flag has been positioned beforehand, the SAR module:
- again modifies the size of the second packet, so as to obtain a second modified size equal to the previously stored value (see the state referenced 805) in the register named "remaining size";
- positions the flag named "synchro insertion";
- goes back into the "checking of size" state (referenced 806), to send a second (synchronization) packet.

It will be seen that the sum of the size (second modified size) of the second synchronization packet and the size (first modified size) of the preceding second packet is equal to the normal size of the second packet, at the instant considered. This enables the utmost compliance with the QoS contract for the transmission of the data stream. Indeed, these two second packets (namely the synchronization second packet and preceding second packet respectively) may be processed during one and the same isochronous cycle.

If the "truncated second packet" has not been positioned beforehand, the SAR module goes back into the "initialization" state (referenced 801).

Figure 8:
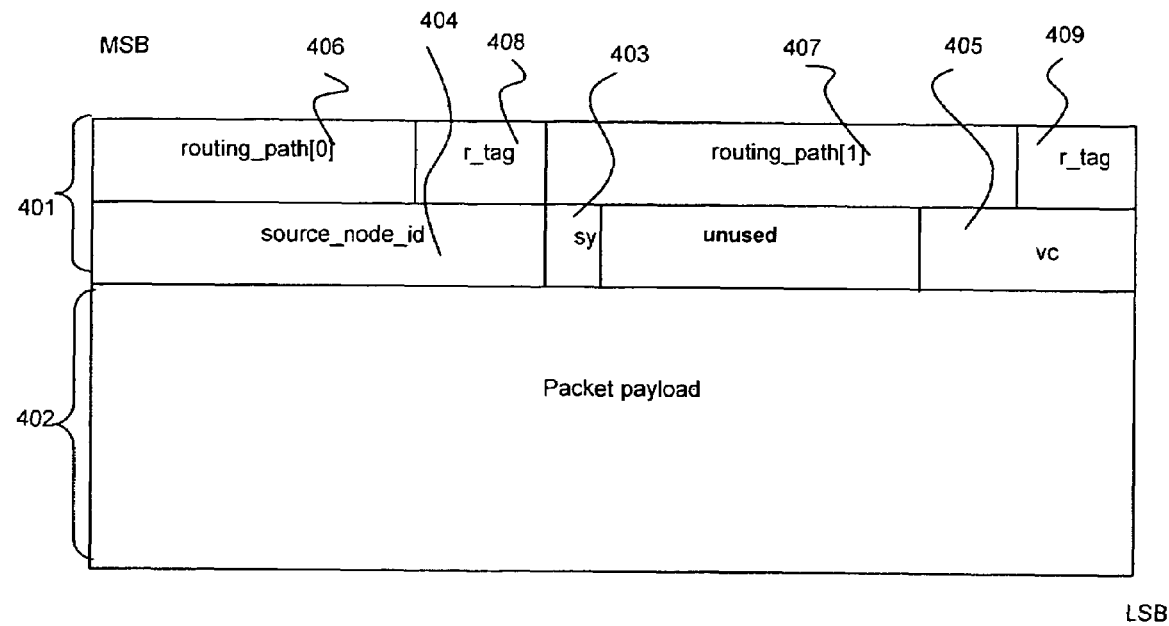
FIG. 8 describes an example of a structure of a second packet, conveyed on the switched network included in the home audiovisual network of FIG. 1, and comprising a synchronization field according to the method of the invention.

FIG. 8 describes an example of a structure of a second packet, conveyed on the switched network 1 contained in the home audiovisual network of FIG. 1. A packet structure of this kind comprises a header 401 and a useful part 402.

According to the invention, the header 401 comprises a synchronization field 403, encoded for example on one bit and named "sy". It is in this synchronization field 403 that the SAR module inserts a synchronization marker, if the "synchro insertion" flag has been positioned beforehand (see the above description of the "writing of the packet header" state referenced 809 in FIG. 6).

The header furthermore comprises a source node address (404), a virtual channel (405), routing information fields (406, 407) and tags (408, 409) indicating the type of the transmission over the switched network (broadcast, unicast, . . . ). Some of these fields are defined in the IEEE 1355 Standard, and are not described in greater detail here.

It may be recalled that the IEEE 1355 Standard is defined by the reference Std 1355-1995 Standard for Heterogeneous InterConnect (HIC) (Low Cost Low Latency Scalable Serial Interconnect) (aka ISO/IEC 14575 DIS).

Figure 10:
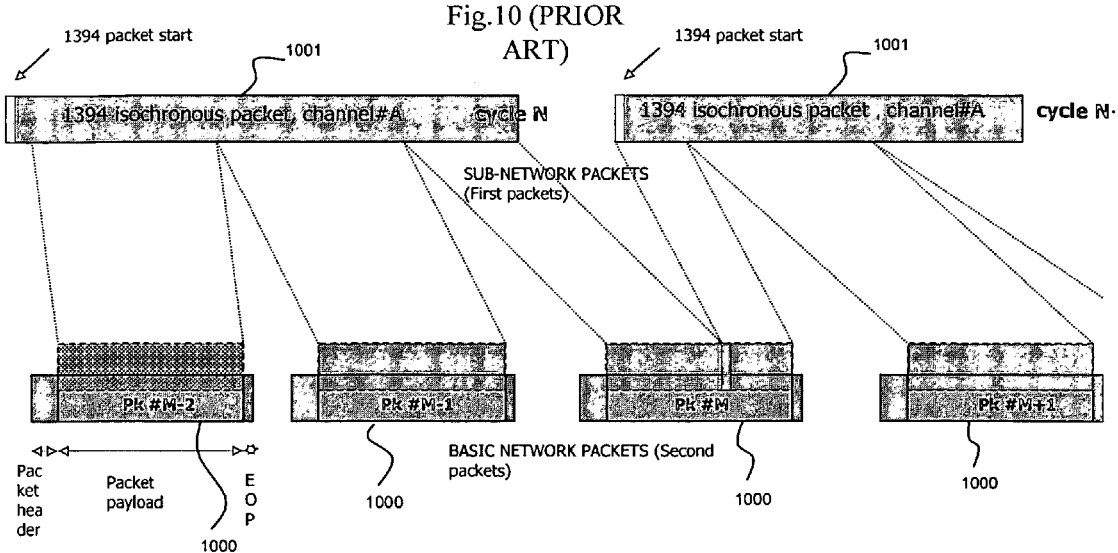
FIG. 10 illustrates an example of segmentation and scheduling mechanism according to the prior art.
Figure 11:
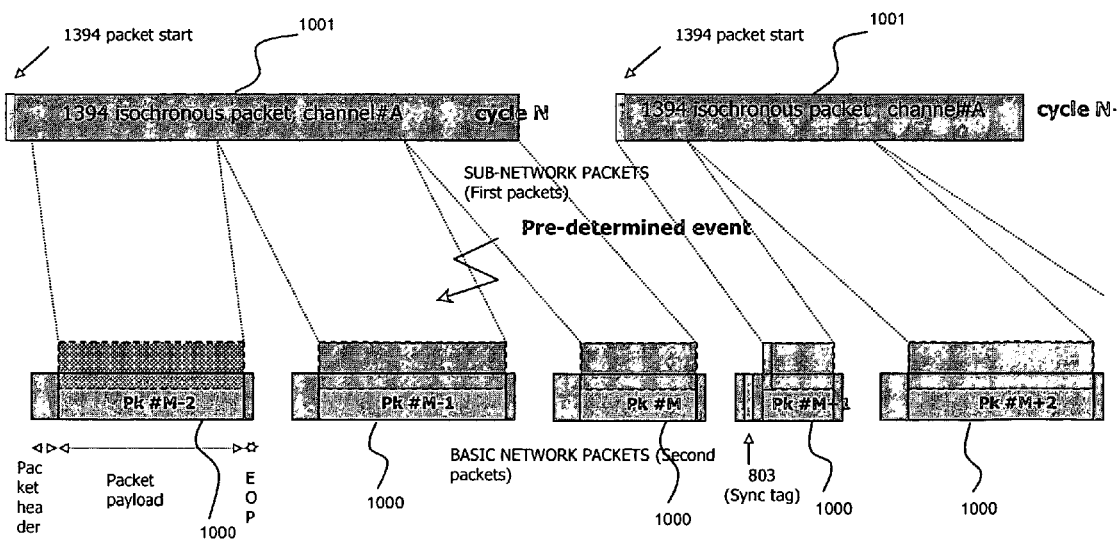
FIG. 11 illustrates an example of segmentation and scheduling mechanism according to the invention.

FIG. 11 illustrates the segmentation and scheduling mechanism in order to send IEEE1394 isochronous data over the switched network when applying the invention. In normal operation of the network, data segmentation and scheduling is performed as described in detail here above with reference to FIG. 10, but on a predetermined event (node re-plug after unplug, connection of a second receiver node for an already established data stream connection) the entry node modifies the transfer conditions in order to solve the above-mentioned limitation. Thus after the occurrence of the pre-determined event the entry node checks if the next packet (second packet) 1000 will contain the boundary of an original IEEE1394 isochronous packet (first packet) 1001. In the case the boundary of the basic network packet and the boundary of the original IEEE1394 isochronous packet are not matching, the entry node will adapt (reduce in the case represented on the figure) the size of the basic network packet (Pk#M) so that the following basic packet (Pk#M+1) boundary will match an IEEE1394 isochronous packet boundary. An indicator (synchronization tag) 803 is set in the header of the corresponding basic network packet (Pk#M+1) to indicate that the boundaries are matching. This packet is called a synchronization packet. It contains isochronous data as any other basic network stream packet in addition to the synchronization tag. Thus destination nodes entering an unpredictable state when receiving a data stream (re-plugged, newly connected to an already existing stream, . . . ) can discard the basic network packet for that stream until finding the above-mentioned indicator in the packet header.

Figure 9:
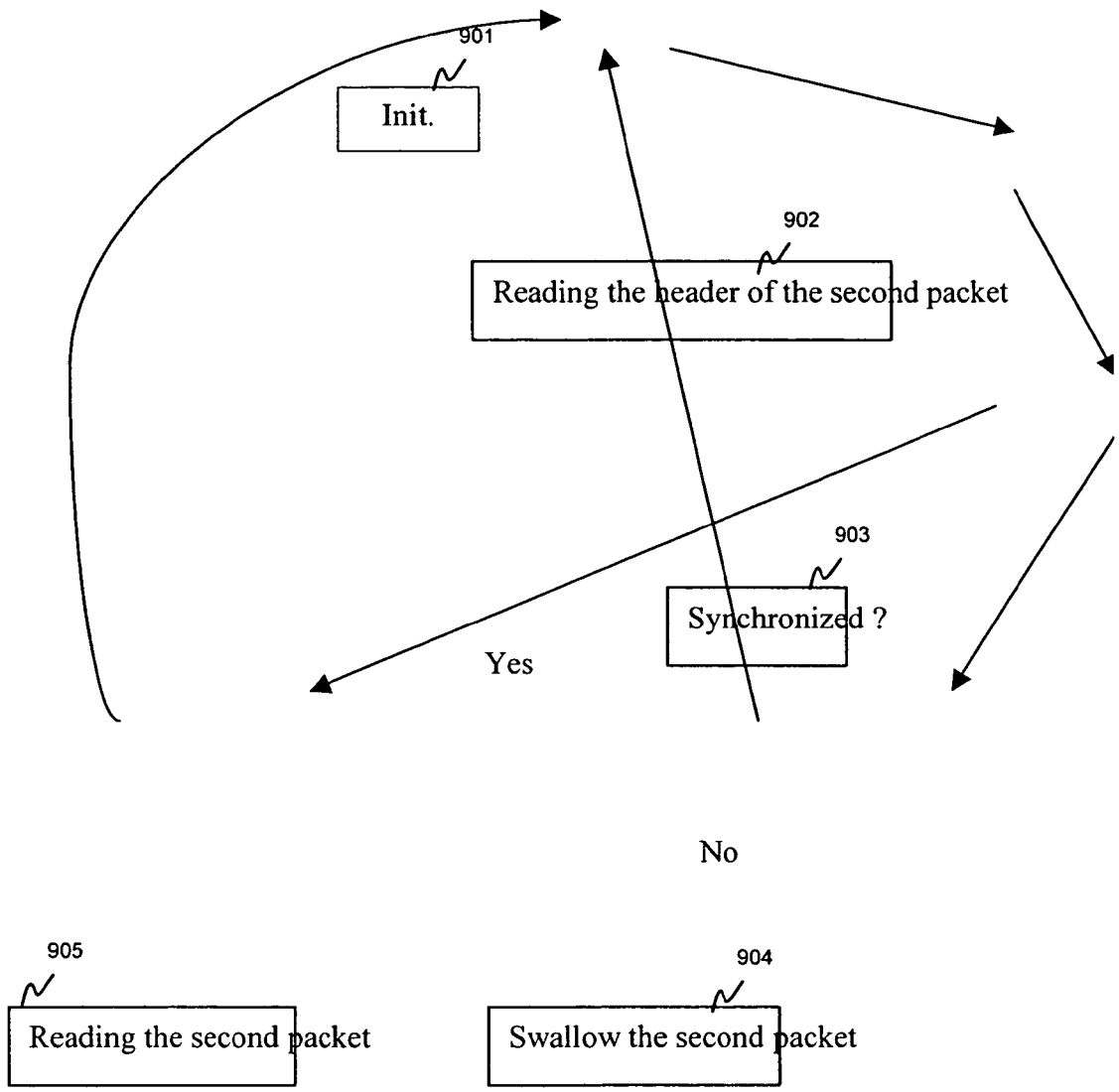
FIG. 9 presents a flow chart of the particular embodiment of the synchronization method according to the invention, for the part implemented by the SAR module of the destination node.

Referring to FIG. 9, we shall now present a special embodiment of the method of synchronization according to the invention, for the part implemented by the SAR module 109 of a destination node.

It may be recalled that, in the above-mentioned example, the node referenced 205/206 is a first destination node, for the stream intended for the first destination terminal referenced 9, and the node referenced 207/208 is a second destination node for the stream intended for the second destination terminal referenced 14.

It will also be recalled that the role of a destination node is to de-encapsulate first (IEEE 1394 type) packets contained in the (IEEE 1355 type) packets which it receives and to transmit these first packets to the destination terminal that is connected to it.

In the "initialization" state (referenced 901), the SAR module waits for the FIFO memory of the switch 108 to become full. Then it goes into the "read second packet header" state (referenced 902).

In this "read second packet header" state (referenced 902), it reads the header of the second packet from the FIFO memory of the switch, and goes into the "synchronized ?" state (referenced 903).

In the "synchronized ?" state (referenced 903), the SAR module decides whether the second packet must be swallowed or stored in the DPRAM 106. If the destination node has already received a second packet, whose header contains a synchronization marker, from the time that the data stream considered has been open, then the SAR module goes into the "read second packet" state (referenced 905). If not, the SAR module ascertains that the synchronization marker is present in the header of the second packet. If the answer is positive (with the presence of a marker), it goes into the "read second packet" state (referenced 905). If the answer is negative (with no marker), it goes into the "swallow second packet" state (referenced 904).

In the "swallow second packet" state (referenced 904), the SAR module reads the second packet in the FIFO memory of the switch, to release the stream, but does not store it. Than it goes back into the "initialization" state (referenced 901).

In the "read second packet" state (referenced 905), the SAR module sends the second packet of the FIFO memory of the switch to the DPRAM 106. Then it goes back into the "initialization" state (referenced 901).

Thus the IEEE 1394 interfacing means (referenced 103 in FIG. 2) cannot read the first (IEEE 1394 type) packets in the DPRAM 106, to send them to the destination terminal connected to it, so long as the destination node has not received any second synchronization packet (comprising a synchronization marker).

Since a start of a first packet is matched with the start of this second synchronization packet, the destination terminal will receive an entire first packet at the outset. This will enable the synchronization of the terminal and therefore the reception of all the following first packets.

What is claimed is:

1. A method for the insertion of information to synchronize a destination node with a data stream transmitted from an entry terminal in a heterogeneous network, the heterogeneous network including at least one sub-network conveying packets of a first type and one basic network conveying packets of a second type, the entry terminal being connected to the sub-network, the sub-network being connected to the basic network by means of an entry node forming the packets of the second type from at least one sub-part of at least one packet of the first type, wherein the size of the useful information of packets of the second type is independent of the size of packets of the first type, wherein, at the occurrence of at least one predetermined event, the entry node:
  forms a synchronization packet of the second type such that the beginning of useful information of the synchronization packet corresponds to the beginning of the packet of the first type;
  inserts a synchronization marker in the synchronization packet; and
  modifies the size of a packet of the second type preceding the synchronization packet such that the end of the useful information of said packet of the second type corresponds to the end of a packet of the first type.

2. A method according to claim 1, wherein said predetermined event is reached at a predetermined instant from among a plurality of predetermined instants.

3. A method according to claim 2, wherein the plurality of predetermined instants succeed one another in a cycle with a fixed period.

4. A method according to claim 1, wherein said predetermined event is the reception, by the entry node, of a synchronization request.

5. A method according to claim 4, wherein a synchronization request is sent out by a node belonging to a group comprising:
- a first destination node, to which there is connected a first destination terminal that has formulated a first request for connection with the entry terminal, to receive said data stream; and
- a second destination node, to which there is connected a second destination terminal that has formulated a second request for connection with the entry terminal, to receive said data stream, after a connection has already been set up between the first destination terminal and the entry terminal for said data stream.

6. A method according to claim 1, wherein the entry node modifies the size of the synchronization packet of the second type in such a way that the sum of the modified size of the preceding packet of the second type and the modified size of the synchronization packet of the second type is substantially equal to a normal size of a packet of the second type.

7. A method according to claim 1, wherein the entry node manages a mechanism for obtaining, after each occurrence of a predetermined event, a current distance, in memory, between a memorized position of a forthcoming start of a packet of the first type and a current position of a read pointer used for the building of the packets of the second type.

8. A method according to claim 7, wherein the entry node performs the following steps:
- the entry node obtains said current distance;
- if the current distance is equal to zero, the entry node generates and sends a synchronization packet of the second type for which the start of payload data corresponds to the start of a packet of the first type, this synchronization packet comprising a synchronization marker;
- if the current distance is smaller than the normal size of the packet of the second type, the entry node generates and sends a truncated packet of the second type, called a preceding packet of the second type, whose reduced size is equal to the current distance, then generates and sends a synchronization packet of the second type for which the start of the payload data corresponds to the start of the packet of the first type, this synchronization packet comprising a synchronization marker; and
- if the current distance is greater than or equal to the normal size of the packet of the second type, the entry node sends a normal-sized packet of the second type that is not a synchronization packet of the second type.

9. A method for the processing of information for the synchronizing of a destination node with a data stream transmitted from an entry terminal in a heterogeneous network, the heterogeneous network including at least one sub-network conveying packets of a first type and a basic network conveying packets of a second type, the sub-network being connected to the basic network by means of a destination node,
wherein the size of useful information of packets of the second type is independent of the size of packets of the first type,
wherein the destination node:
- detects a synchronization packet of the second type among the packets of the second type conveyed by the basic network by means of a synchronization marker contained in the synchronization packet of the second type;
- forms a synchronization packet of the first type from at least one synchronization packet of the second type, such that the beginning of the synchronization packet of the first type corresponds to the beginning of useful information of the synchronization packet of the second type; and
- transfers the synchronization packet of the first type to the sub-network.

10. A method according to claim 9 wherein, following the transfer of the synchronization packet of the first type, the destination node:
- forms packets of the first type out of packets of the second type associated with the data stream; and
- transfers the packets of the first type formed on the sub-network.

11. A method according to claim 9 wherein so long as it has not detected a synchronization packet of the second type, the destination node swallows the received packets of the second type, without forming packets of the first type.

12. A node in a heterogeneous network, the heterogeneous network including at least one sub-network conveying packets of a first type and a basic network conveying packets of a second type, wherein the size of useful information of packets of the second type is independent of the size of packets of the first type, and wherein the node comprises:
- forming means for forming a synchronization packet of the second type such that the start of payload data of the synchronization packet of the second type corresponds to the start of a packet of the first type;
- inserting means for inserting a synchronization marker in the synchronization packet of the second type; and
- modification means for modifying the size of a packet of the second type preceding the synchronization packet of the second type, such that the end of the useful information of said packet of the second type corresponds to the end of a packet of the first type.

13. A node according to claim 12, wherein said forming means forms the synchronization packet of the second type at the occurrence of a predetermined event, said predetermined event being reached at a predetermined instant from among a plurality of predetermined instants.

14. A node according to claim 13, wherein the plurality of predetermined instants succeed one another in a cycle with a fixed period.

15. A node according to claim 12, wherein said forming means forms the synchronization packet of the second type at the occurrence of a predetermined event, said predetermined event being reception, by the node, of a synchronization request.

16. A node according to claim 15, wherein the synchronization request is sent out by a node belonging to a group comprising:
- a first destination node, to which there is connected a first destination terminal that has formulated a first request for connection with an entry terminal, to receive said data stream; and
- a second destination node, to which there is connected a second destination terminal that has formulated a second request for connection with the entry terminal, to receive said data stream, after a connection has already been set up between the first destination terminal and the entry terminal for said data stream.

17. A node according to claim 12, wherein said modification means modifies the size of the synchronization packet of the second type in such a way that the sum of the modified size of the preceding packet of the second type and the modified size of the synchronization packet of the second type is substantially equal to a normal size of a packet of the second type.

18. A node according to claim 12, further comprising means for obtaining a current distance in memory between a memorized position of a forthcoming start of a packet of the first type and a current position of a read pointer used for the building of the packets of the second type.

19. A node according to claim 18, further comprising means for selective activation as a function of the value of the current distance obtained, such that:

- if the current distance is equal to zero, the activation means activates means for generating and sending a synchronization packet of the second type for which the start of the payload data corresponds to the start of a packet of the first type, this synchronization packet of the second type comprising a synchronization marker;
- if the current distance is smaller than the normal size of a packet of the second type, the activation means activates means for generating and sending a truncated packet of the second type, called a preceding packet of the second type, whose reduced size is equal to the current distance, then activates means for generating and sending a synchronization packet of the second type for which the start corresponds to the start of a packet of the first type, this synchronization packet of the second type comprising a synchronization marker; and
- if the current distance is greater than or equal to the normal size of a packet of the second type, the activation means activates means for sending a normal-sized packet of the second type that is not a synchronization packet of the second type.

20. A node in a heterogeneous network, the heterogeneous network including at least one sub-network conveying packets of a first type and one basic network conveying packets of a second type, wherein the size of useful information of packets of the second type is independent of the size of packets of the first type, and wherein the node comprises:

- detecting means for detecting a synchronization packet of the second type among the packets of the second type conveyed by the basic network by a synchronization marker contained in the synchronization packet of the second type;
- forming means for forming a synchronization packet of the first type from at least one synchronization packet of the second type, such that the beginning of the synchronization packet of the first type corresponds to the beginning of useful information of the synchronization packet of the second type; and
- a transmitter for transmitting the synchronization packet of the first type to the sub-network.

21. A node according to claim 20, wherein said forming means forms packets of the first type out of packets of the second type associated with the data stream following the transmission of the synchronization packet of the first type, and wherein said transmitter transmits the packets of the first type formed on the sub-network.

22. A node according to claim 20, further comprising means for swallowing the received packets of the second type, without forming packets of the first type so long as it has not detected a synchronization packet of the second type.

* * * * *